(12) United States Patent
Blandford et al.

(10) Patent No.: US 8,346,886 B2
(45) Date of Patent: Jan. 1, 2013

(54) SYSTEM, METHOD, AND MEDIUM FOR CONFIGURING CLIENT COMPUTERS TO OPERATE DISCONNECTED FROM A SERVER COMPUTER WHILE USING A MASTER INSTANCE OF THE OPERATING SYSTEM

(75) Inventors: Jonathan Richard Blandford, Groton, MA (US); John Ross Dennis, Auburn, MA (US); Alexander Tobias Larsson, Stockholm (SE); David Hugh Malcolm, Stoneham, MA (US); Mark Brian McLoughlin, Clontarf (IE); Seth Aaron Nickell, Nashua, NH (US); Havoc Pennington, North Chelmsford, MA (US); Brian Stevens, New Boston, NH (US); Owen Wayne Taylor, Waltham, MA (US)

(73) Assignee: Red Hat, Inc., Raleigh, NC (US)

( * ) Notice: Subject to any disclaimer, the term of this patent is extended or adjusted under 35 U.S.C. 154(b) by 1078 days.

(21) Appl. No.: 10/935,712

(22) Filed: Sep. 8, 2004

(65) Prior Publication Data

US 2006/0080385 A1   Apr. 13, 2006

(51) Int. Cl.
  *G06F 15/16*   (2006.01)
  *G06F 15/177*   (2006.01)
(52) U.S. Cl. ....................... 709/217; 709/220
(58) Field of Classification Search .................. 709/217, 709/218
  See application file for complete search history.

(56) References Cited

U.S. PATENT DOCUMENTS

| | | | | |
|---|---|---|---|---|
| 5,491,800 | A | * | 2/1996 | Goldsmith et al. ........... 709/221 |
| 5,553,239 | A | | 9/1996 | Heath et al. |
| 5,577,251 | A | * | 11/1996 | Hamilton et al. ............ 718/101 |
| 5,742,829 | A | | 4/1998 | Davis et al. |
| 5,787,251 | A | * | 7/1998 | Hamilton et al. ............ 709/203 |
| 5,809,313 | A | * | 9/1998 | Gianni ......................... 713/310 |
| 5,828,876 | A | | 10/1998 | Fish et al. |
| 5,828,888 | A | * | 10/1998 | Kozaki et al. ................ 717/170 |
| 5,905,896 | A | * | 5/1999 | Delannoy ..................... 717/170 |
| 6,061,721 | A | * | 5/2000 | Ismael et al. ................. 709/223 |
| 6,151,674 | A | * | 11/2000 | Takatani .......................... 713/2 |
| 6,393,442 | B1 | * | 5/2002 | Cromarty et al. ............ 715/205 |
| 6,718,548 | B1 | | 4/2004 | Hsiao et al. |
| 7,356,677 | B1 | * | 4/2008 | Rafizadeh ........................ 713/1 |
| 7,558,958 | B2 | * | 7/2009 | Lieberman et al. ........... 713/176 |
| 2002/0161860 | A1 | * | 10/2002 | Godlin et al. ................. 709/219 |
| 2003/0023839 | A1 | * | 1/2003 | Burkhardt et al. ................ 713/1 |
| 2004/0015831 | A1 | | 1/2004 | Bowhill |
| 2004/0073630 | A1 | * | 4/2004 | Copeland et al. ............ 709/218 |

(Continued)

OTHER PUBLICATIONS

Walter F. Tichy "Design, Implementation, and Evaluation of a Revision Control System" pp. 58-67 (1982).

(Continued)

*Primary Examiner* — Kenny Lin
*Assistant Examiner* — Gerald Smarth
(74) *Attorney, Agent, or Firm* — Wilmer Cutler Pickering Hale and Dorr LLP

(57) ABSTRACT

A computer system comprises a server. The server, in turn, comprises one or more master instances of an operating system (OS). The OS comprises a set of computer program files to operate a computer. The server also includes a version-managing program maintaining the one or more master operating systems. The computer system also includes a number of client computers each of which is configured to operate using one of the one or more master operating systems as read-only files.

20 Claims, 7 Drawing Sheets

U.S. PATENT DOCUMENTS

| | | | |
|---|---|---|---|
| 2004/0083355 A1 | 4/2004 | Smith et al. | |
| 2004/0153526 A1* | 8/2004 | Haun et al. | 709/217 |
| 2004/0163008 A1* | 8/2004 | Kim | 714/4 |
| 2006/0259596 A1* | 11/2006 | Birse et al. | 709/220 |
| 2007/0239851 A1* | 10/2007 | Bryant et al. | 709/218 |
| 2009/0031006 A1* | 1/2009 | Johnson | 709/218 |

OTHER PUBLICATIONS

European Search Report for Application No. EP 05 25 5532 dated Feb. 8, 2006.

Khushraj, Abhinav, Abdelsalam (Sumi) Helal, and Jinsuo Zhang. 2002. "Incremental Hoarding and Reintegration in Mobile Environments." Computer and Information Science and Engineering Department, University of Florida, Gainesville, Florida.

Tait, Carl, Hui Lei, Swarup Acharya, and Henry Chang. Nov. 1995. "Intelligent File Hoarding for Mobile Computers." *ACM Conference on Mobile Computing and Networking* (Mobicom '95), Berkeley, California.

Satyanarayanan, M., James J. Kistler, Lily B. Mummert, Maria R. Ebling, Puneet Kumar, and Qi Lu. Jun. 1993. "Experience with Disconnected Operation in a Mobile Computing Environment." *Proceedings of the 1993 USENIX Symposium on Mobile and Location-Independent Computing*, Cambridge, Massachusetts.

Huston, L.B. and P. Honeyman. Jun. 18, 1993. "CITI Technical Report 93-3: Disconnected Operation for AFS." Center for Information Technology Integration, University of Michigan, Ann Arbor, Michigan. pp. 1-9 and Abstract.

Kistler, James J. and M. Satyanarayanan. Feb. 1992. "Disconnected Operation in the Coda File System." *ACM Transactions on Computer Systems*, vol. 10, No. 1, pp. 3-25.

Adams, Steve. Oct. 1999. *Oracle8i Internal Services: for Waits, Latches, Locks, and Memory.* O'Reilly & Associates, Inc. Sebastopool, California.

Shah, Jay. 1994. "VAXclusters and Other High-Availability Systems." *VAXclusters: Architecture, Programming and Management.* McGraw-Hill, Inc. p. 57-99.

Kenah, Lawrence J. et al. 1984. "VAX/VMS Lock Manager." *VAX/VMS Internals and Data Structures.* Digital Press. p. 244-263.

Sun Microsystems, "Solaris 9 4/04 Installation Guide", pp. 1-20, 35-39, 109-162, 191-242 (2004).

\* cited by examiner

Fig. 4 (at the server computer)

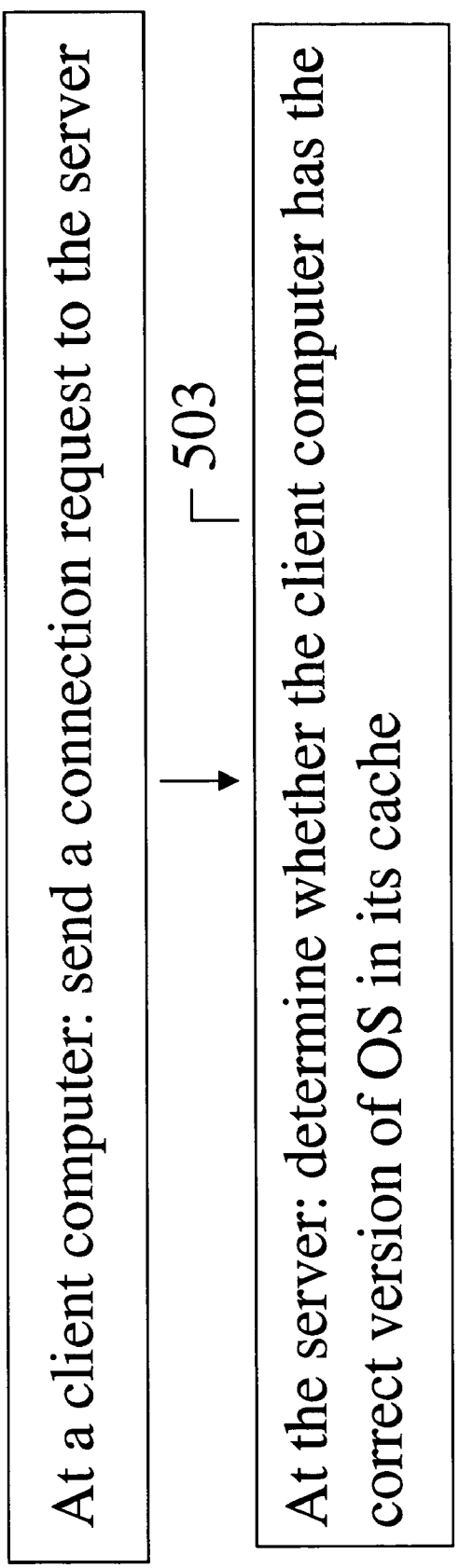
Fig. 5
501 At a client computer: send a connection request to the server
503 At the server: determine whether the client computer has the correct version of OS in its cache
No → Fig. 6
Yes ↓
505 Allow the client computer To operate using the cached OS

SYSTEM, METHOD, AND MEDIUM FOR CONFIGURING CLIENT COMPUTERS TO OPERATE DISCONNECTED FROM A SERVER COMPUTER WHILE USING A MASTER INSTANCE OF THE OPERATING SYSTEM

FIELD OF THE INVENTION

The present invention relates to improvements in computer networks. In particular, the present invention is directed to improving the management of Operating Systems and/or user data to allow client computers of computer networks to operate disconnected from the network.

BACKGROUND OF THE INVENTION

Computers at businesses or universities are usually networked together. A typical computer network includes a server computer connected to a number of client computers. In a conventional computer network, the server computer provides large disk storage and/or software applications to which the client computers have access. The client computers can be stand-alone computers or "diskless" computers. A stand-alone computer has necessary software (e.g., Operating Systems (OS), user applications, and the like) and hardware components (e.g., hard disks) to operate disconnected from the server computer, if needed. A diskless computer does not have any local hard disk and uses software applications and user data residing on the server computer. Hence, diskless client computers cannot operate without a server computer.

A computer network with only stand-alone client computers is referred to as a thick client network (or "fat" client network), and a network with only diskless computers is called a thin client network. Regardless whether networks are populated with thin or thick client computers, the server and client computers are required to be properly maintained. For instance, the Operating System needs to be modified or updated with new versions, and user data need to be backed up to recover from catastrophic failures (e.g., loss of a client computer).

In a typical thick client network 101 illustrated in FIG. 1 as having a server computer 103 and a number of client computers 105-107, each client computer may use different versions of the Operating System or have some local changes made thereto. For instance, the configuration file for each client computer, a file that describes the devices, optional features, communications parameters, and programs installed on the client computer, is usually modified for each client computer.

When the number of client computers is small and the client computers are configured identically, it is a relatively simple task to maintain them. This is because the client computers most likely have an identical Operating System and, hence, updating it would require only one installation procedure. Recovering from catastrophic failures would also be simple because the identical Operating System needs to be reloaded to a new computer (in the case of replacing a lost computer) and the user data can then be restored from a backup storage device. However, typical networks nowadays include numerous client computers and Operating Systems that are different. An example of such a network is illustrated in FIG. 1, in which a client computer 105 has an Operating System that is "v. 1.2.a" with some local changes, while a client computer 107 has an Operating System that is "v. 1.n.x" with its own local changes. In these types of networks, maintaining the computers becomes an inefficient and time-consuming task because each installation of a new version of the Operating System requires selecting correct installation script options based on each computer's hardware configuration and past upgrade history. Installing a new version of the Operating System often fails due to these requirements.

For this and other reasons, the thin client networks have been recognized as providing solutions to some of the shortcomings of thick client networks. FIG. 2 illustrates an example thin client network 201 that includes a number of client computers 205-207 and a server computer 203. Because the client computers of the thin client network do not have their own local memory disks, there is no software program stored on the client computers. All software applications and user data reside on the server computer. Maintaining such a network is simple compared with the thick client network because there is only one set of software applications to be maintained (i.e., the ones on the server computer). Recovering from catastrophic failures of client computers is also simple because all software applications and user data are located on the server computer.

However, thin client networks have some shortcomings of their own. First, thin client computers completely depend on the server computer. Hence, when the server computer (or the network) fails or slows down due to heavy load or network traffic, the client computers can be rendered inoperable. Second, as the number of client computers increases, the network communication becomes heavily loaded and available bandwidth can be depleted. Also, the server computer can be stretched to its performance limits due to demands from the large number of client computers. This may require expensive upgrades and maintenance on network devices and the server computer.

SUMMARY OF THE INVENTION

The present invention simplifies the maintenance of networked computers by using one or more master Operating Systems on the server computer. The client computers have local hard disks and cache one of the master Operating Systems, permitting the client computers to operate while disconnected from the server computer.

In particular, some embodiments of the present invention include a server computer in a computer system. The server computer includes a master operating system (OS) that comprises a set of computer program files and at least one configuration file to operate a client computer. The server computer also includes a version-managing program maintaining the master OS and a server program configured to transfer the master OS as read-only files to at least one of a plurality of client computers.

In other embodiments, the present invention includes a computer system that comprises a server computer. In turn, the server computer includes: a. at least one master operating system (OS) that comprises a set of computer program files and at least one configuration file to operate a computer; and b. a version managing program that maintains the at least one master OS. The computer system also includes a number of client computers each of which is configured to operate using a designated one of the at least one master OS as read-only files.

In yet other embodiments, the present invention includes a computer program product that resides on a computer-readable medium. The computer program product comprises computer instructions to: a create a. master operating system (OS) comprising a set of computer program files and at least one configuration file to operate a computer; b. maintain the master OS; and c. and transfer the master OS as read-only files to one of a plurality of client computers.

Various embodiments of the present invention can also be implemented in process steps.

BRIEF DESCRIPTION OF THE DRAWINGS

For a fuller understanding of the nature and objects of the present invention, reference should be made to the following detailed description taken in connection with the accompanying drawings in which the same reference numerals are used to indicate the same or similar parts, wherein

FIGS. 5 and 6 are logic flow schematics of example interactions between a client computer and the server computer of an example embodiment of the present invention.

DESCRIPTION OF CERTAIN TERMS

As used in this description, a "client computer" is a computer that contacts a server computer for the purpose of obtaining its operating system. A client computer may be a desktop computer, laptop computer, personal digital assistant (PDA), or the like. It may also be a web server, database server, or other computer that is a server with respect to another operation (such as serving web pages) but is a client with respect to the operation of obtaining the operating system.

As used in this description, a "server computer" is a computer that is a server in the context of distributing a master Operating System. In other words, it serves master OS instances.

A master Operating System (OS) is a reference set of computer programs and configuration file(s) that form a complete OS. A master OS is also known as a reference OS or canonical OS.

DETAILED DESCRIPTION OF PREFERRED EMBODIMENTS

Figure 1:
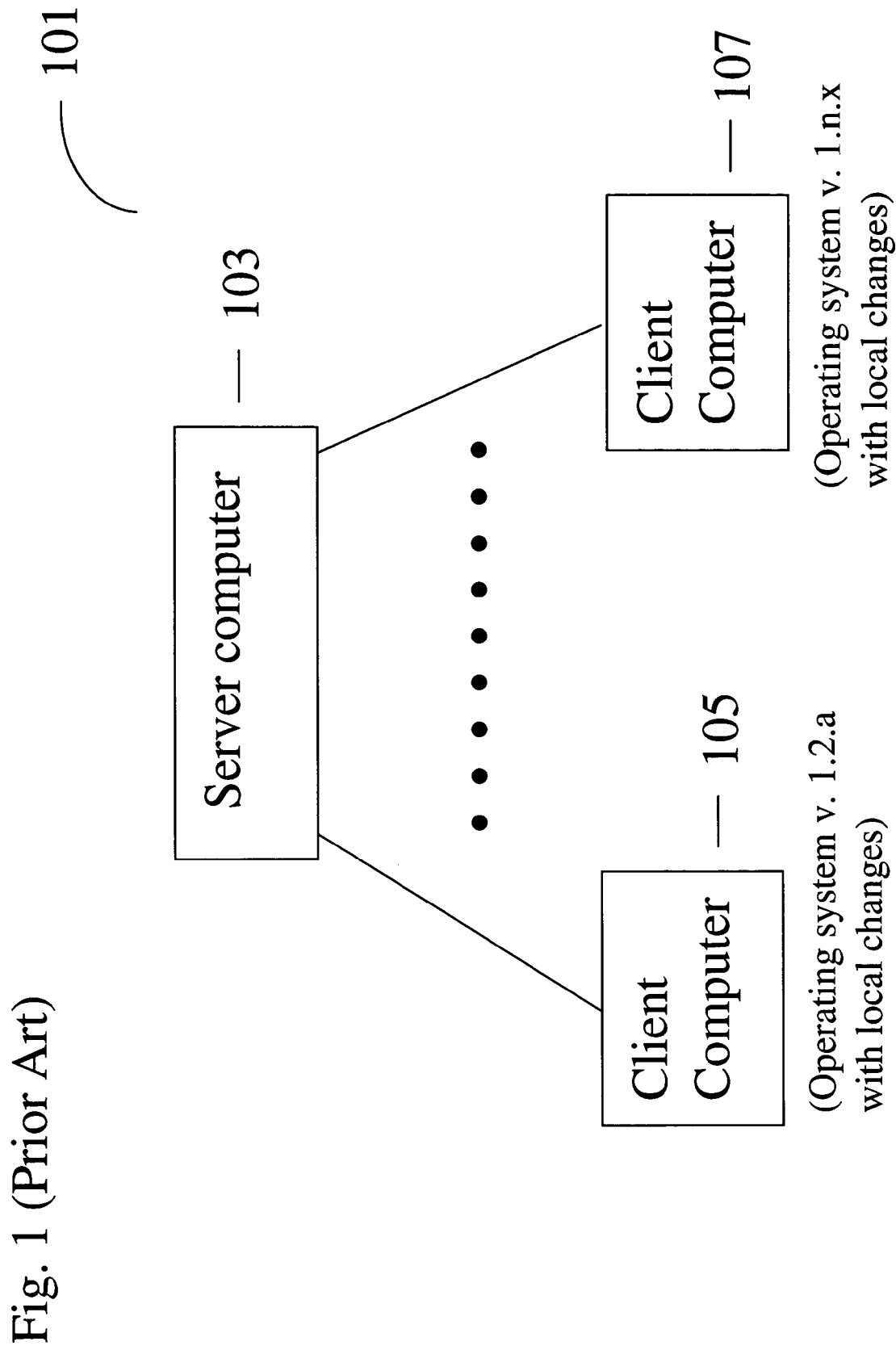
FIG. 1 is a block schematic diagram of a conventional thick client network.
Figure 2:
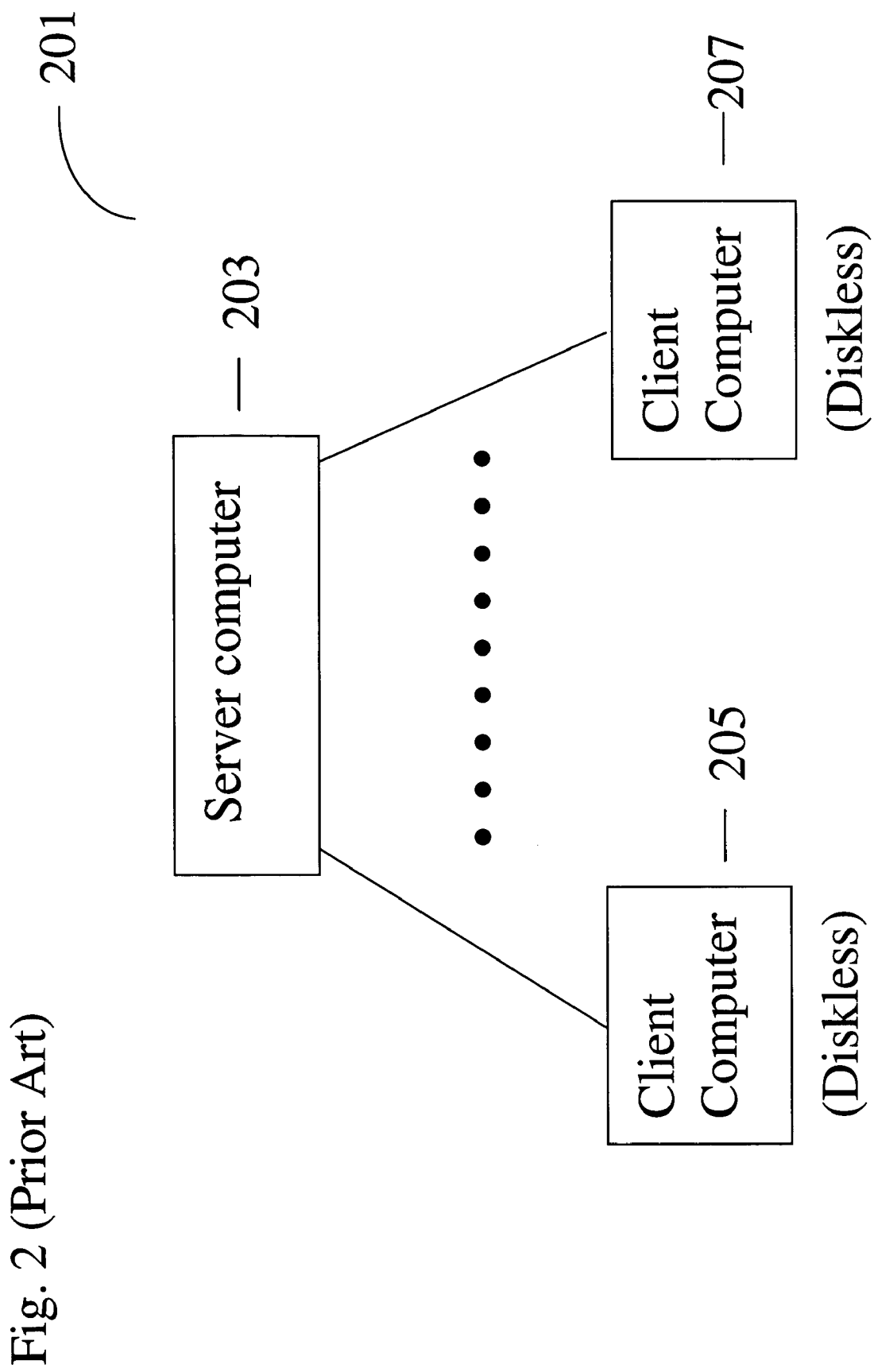
FIG. 2 is a block schematic diagram of a conventional thin client network.
Figure 3:
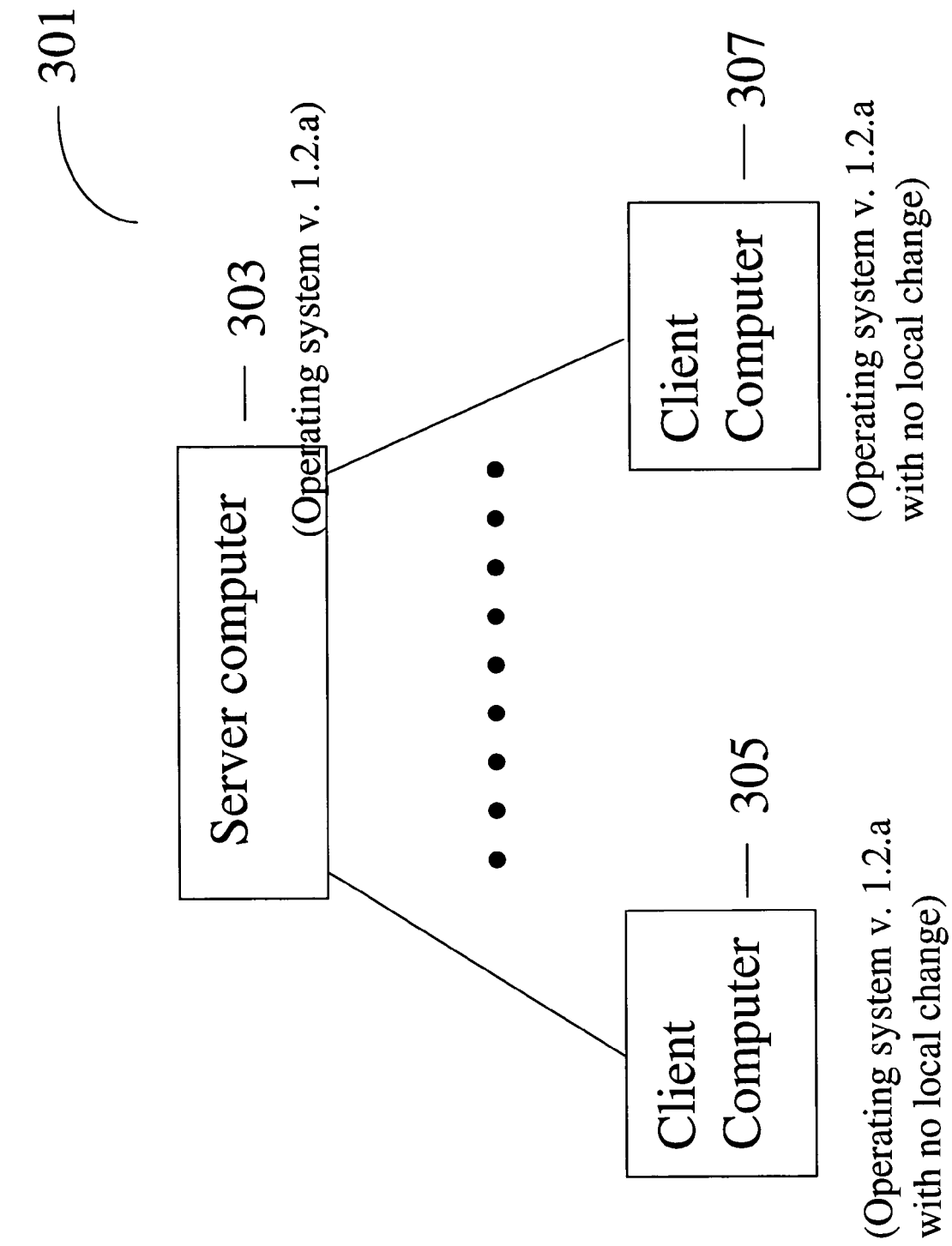
FIG. 3 is a block schematic diagram of an example server/client network of an example embodiment of the present invention.

As illustrated in FIG. 3, an example embodiment of the present invention includes a server computer 303 and a number of client computers 305-307. The client and server computers can be located in one specific physical site, as in a Local Area Network ("LAN"), or can be located at different physical sites linked together by means of phone lines and modems or other forms of long distance communications. The client computers are preferably thick client computers; however, thin client computers can also be included in some embodiments.

In one example embodiment of the server computer 303, one master Operating System (OS) is maintained for all client computers. In the example illustrated in FIG. 3, it is the OS "v. 1.2.a." The master OS is then transferred to the client computers 305-307 causing all client computers to operate using the master OS (i.e., v. 1.2.a). It should be noted that it is preferable to disallow any local changes to the transferred master OS including configuration files. This simplifies maintaining the Operating System because only one master OS is required to be updated/upgraded. The client computers (if they are thick clients) can operate using the transferred master OS while disconnected from the server computer.

Example mechanisms to transfer the master OS from the server computer to the client computer include:

1) Caching the master OS,

2) Distributing the master OS using removable mass storage devices, or

3) Instructing the client computers to use the master OS residing on the server computer. Caching the master OS is preferred for thick client computers in some applications. First, the hard disk of a thick client computer is formatted to include a cache memory that includes two logical partitions. One partition can cache an existing master OS, while the other cache partition can cache a new version of the master OS, as needed. Then, the master OS is cached to one of the partitions on the thick client computer.

When using the removable mass storage devices (e.g., drive devices for DVD-ROMs, CD-ROMs or the like), the server computer writes the master OS to removable storage mediums (e.g., DVD-ROMs, CD-ROMs or the like). The removable storage mediums are then distributed to the client computers. If the client computer is a thick client, it may already have a cached master OS. However, the client computer can be configured so that when a removable storage medium with the master OS is inserted to the client computer, the client computer uses the master OS on the removable storage medium rather than the cached master OS. In another embodiment, the client computer can send a message to the server computer requesting a response as to which one of the two (i.e., the cached master OS and the master OS on the removable storage medium) should be used.

Use of the master OS on the server computer is most commonly applicable to thin client computers. However, thick client computers can be instructed to use the master OS on the server computer instead of the cached master OS if the cached master OS is determined to be out of date. In some instances, a thick client computer may have a cached master OS on its local disk, have received a master OS on a removable storage medium, and have been connected to the server with its own master OS. In such a case, the server computer is configured to determine which one of the three master OS the client computer should use to operate, and instruct the client computer to use the appropriate master OS. In another embodiment, each of the three master Operating Systems can include information indicating the date or version number of the OS. In such an embodiment, the client computer can use the latest version of the three.

Figure 4:
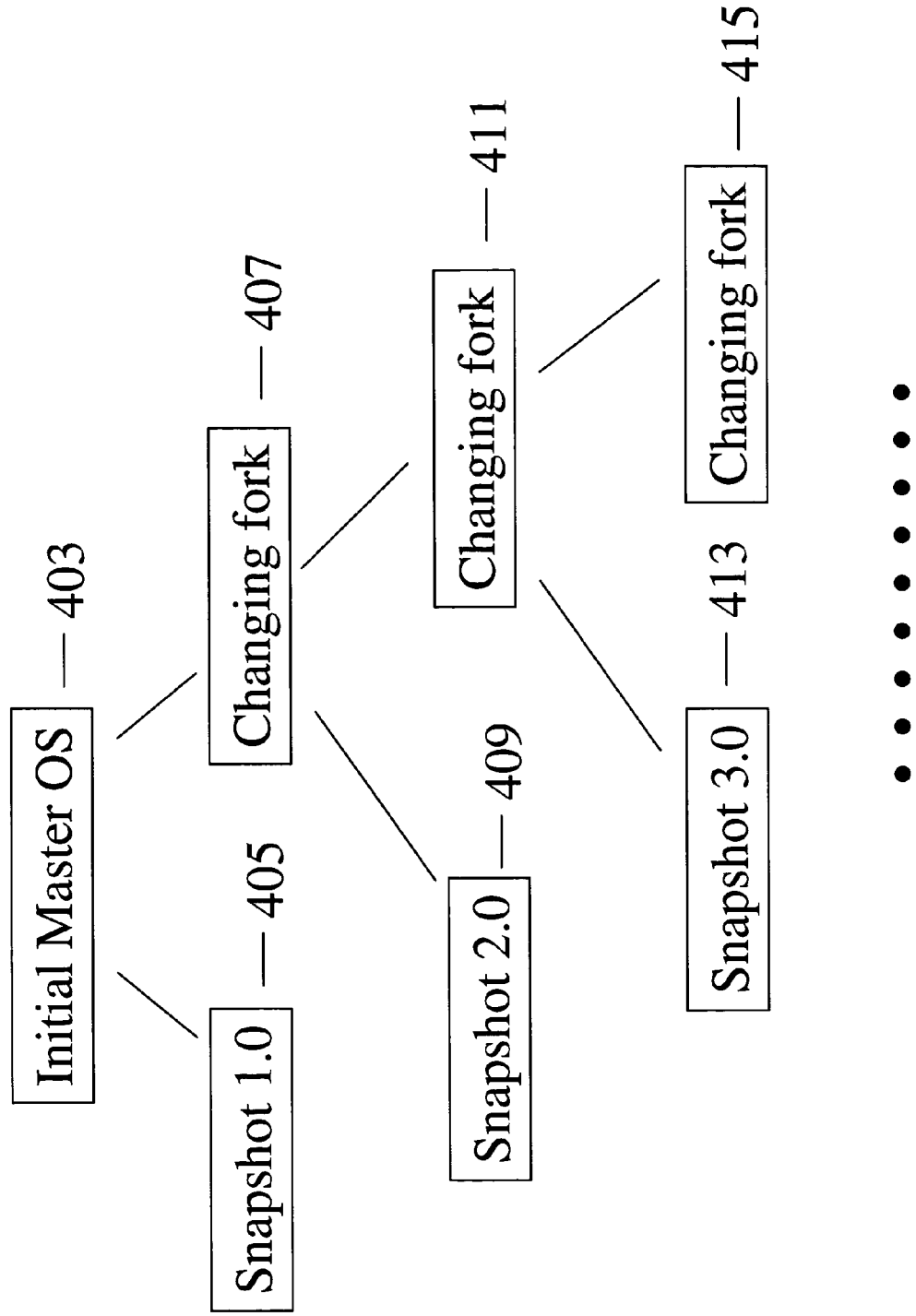
FIG. 4 is a logic flow schematic of an example embodiment of the present invention for modifying and maintaining master Operating Systems while changes are made thereto.

As implied in the above-discussion, the master OS can have different versions because the master OS, as with any other piece of software, is required to be modified (or upgraded) to add new features or functions. One method of maintaining the master OS to be used by the client computers, while allowing modifications, is illustrated in FIG. 4. In this example, an initial master OS is first used by the client computers 403. As modifications are required, a snapshot of the initial master OS is created 405. After creating the snapshot (e.g., v. 1.0), the files of the master OS can be modified in another directory referred to as the "changing fork" 407. After modifications have been made, another snapshot can be created (e.g., v. 2.0) 409. Once the v. 2.0 is created, it can then be transferred to the client computers. As more modifications are required, the above-described steps can be repeated 411, 413,

415. In one embodiment, a "snapshot" is a point-in-time image backup of a volume (e.g., the master OS). In another example embodiment, the snapshot can be a collection of modified files (and only the modified files) between two versions. For instance, the snapshot for v. 2.0 could contain only those files that have been modified (and hence different) from the files in v. 1.0. Such an embodiment can be implemented using a logical volume manager (LVM) program.

The new version of the master OS can then be transferred to the client computers as described above. More specifically, the new version of the master OS can be transferred by using a removable storage medium or instructing the client computer to use the new version. In the case of the client computers using the cached master OS, the new version of the master OS is cached to a different cache partition than the partition where the old version of the cached master OS is located. When the new version of the master OS is completely cached, the client computers are instructed to use the new version (e.g., after a reboot). It should be noted that in case the LVM is used on the server computers, the newly cached master OS would contain only the modified files of the master OS. In such a case, no reboot may be required by the client computer to begin to use the new version of the master OS. The client computer then can begin to use the modified files. The server can determine whether a reboot is required and instruct the client computers accordingly.

Some of the thick client computers may have been disconnected from the server computer when a new version of the master OS is transferred. In such a case, the disconnected client computer is first physically connected back to the network 301. In one embodiment, when the client computer boots up, a message is sent to the server computer (e.g., sending a connection request to the server computer 501). Upon receiving the message, the server determines whether the client computer contains the correct version of the OS in its cache 503. If the client computer has the correct version of the OS (i.e., the master OS on the server computer is identical to the previously cached version on the client computer), the client computer is allowed to operate using the cached OS 505. If the client computer has an older version of the OS, the client computer is instructed to use the master OS stored on the server computer over the network 601. While the client computer is operating using the master OS stored on the server computer, the master OS on the server computer is also cached to the client computer 603. After the completion of caching the master OS to the client computer, the client computer is instructed to operate using the cached master OS 605. The step of switching to the cached master OS takes place by, for example, rebooting the client computer. In another embodiment, the client computer sends a message to the server computer requesting information regarding the master OS on the server computer. If the client computer determines that the cached master OS (i.e., a previously cached version) is identical to the master OS on the server computer, then the client computer operates using the cached version. If they are not identical, the client computer initiates the steps of caching the master OS from the server computer and switching to it as described above.

Figure 6:
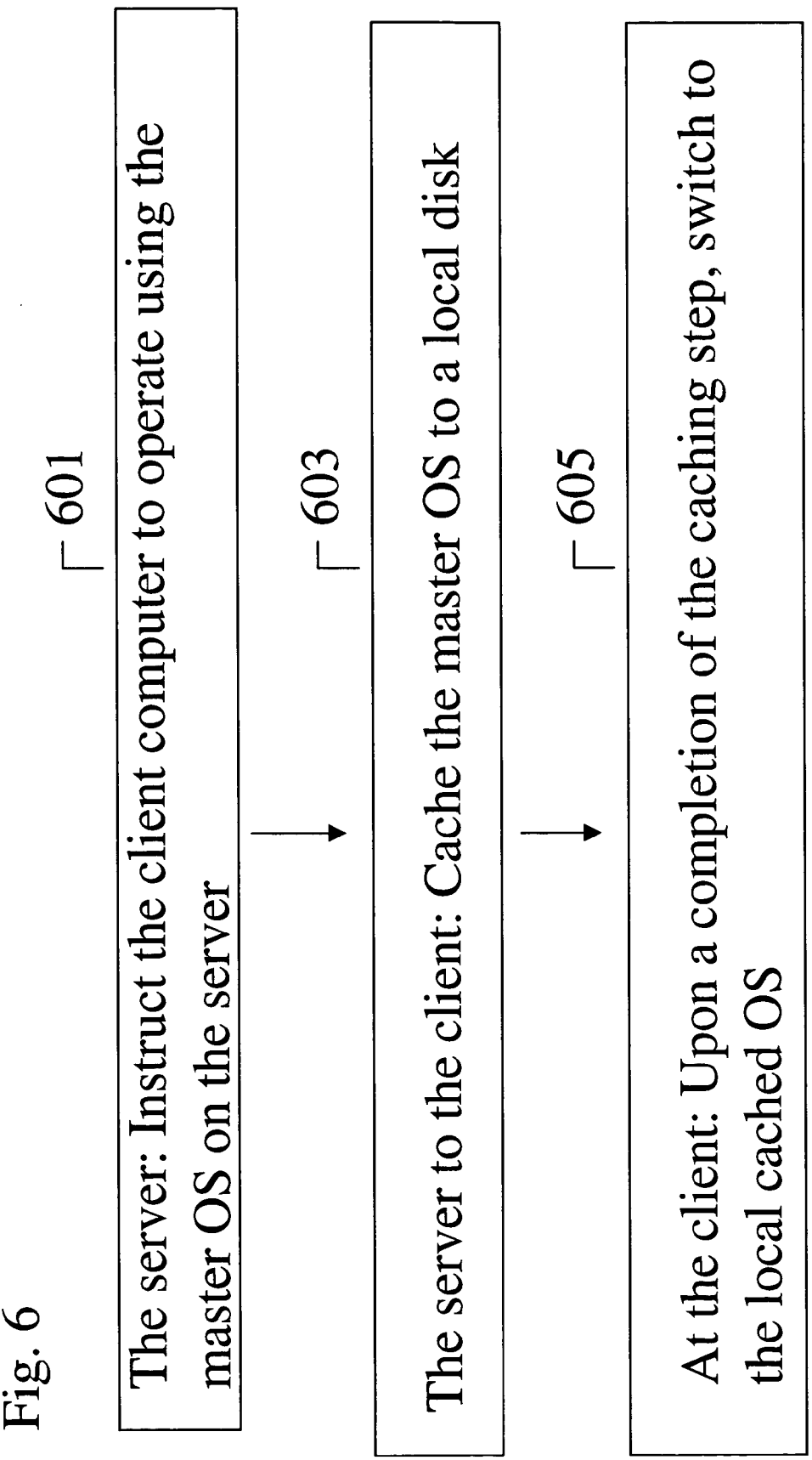

In another example embodiment of the server computer 303, more than one master OS can be maintained for different operating systems (e.g., Linux, SUN OS, Windows, etc.). Furthermore, master Operating Systems for different hardware configurations can also be maintained. For instance, one master OS can be used on a client computer with high-speed printers, while another master OS can be used on a client computer with a high-resolution display monitor. It should be noted, however, that there is only one active master OS for each different operating system and configuration. In this example embodiment, the server computer includes a dynamic mapping program that maps each client computer to a corresponding master OS that matches the client computer's Operating System and configuration. The step of caching the master OS to the client computers functions similarly to the steps described in connection with FIGS. 5 and 6. The only additional step in this example embodiment is the step of mapping each client computer with the corresponding master OS stored on the server computer.

In yet another example embodiment, the server computer 303 can also include a removable mass storage device. In this example embodiment, the latest version of the entire master OS is written on to removable storage mediums. These removable storage mediums can then be distributed to one or more client computers. In such instances, the client computers operate using the master OS of the removable storage mediums rather than the master OS stored in the cache partitions. The client computers operate using the master OS of the removable storage mediums rather than the master OS stored in the cache partitions.

In another aspect of the present invention, a "master" copy of user data and applications can also be saved at a storage device accessible by the server computers. The storage device can be any large electronic storage device separate from the client computers for which it provides backup. This allows a user to "restore" a lost or broken computer with the master OS and the master copy of the user data and software applications.

Figure 7:
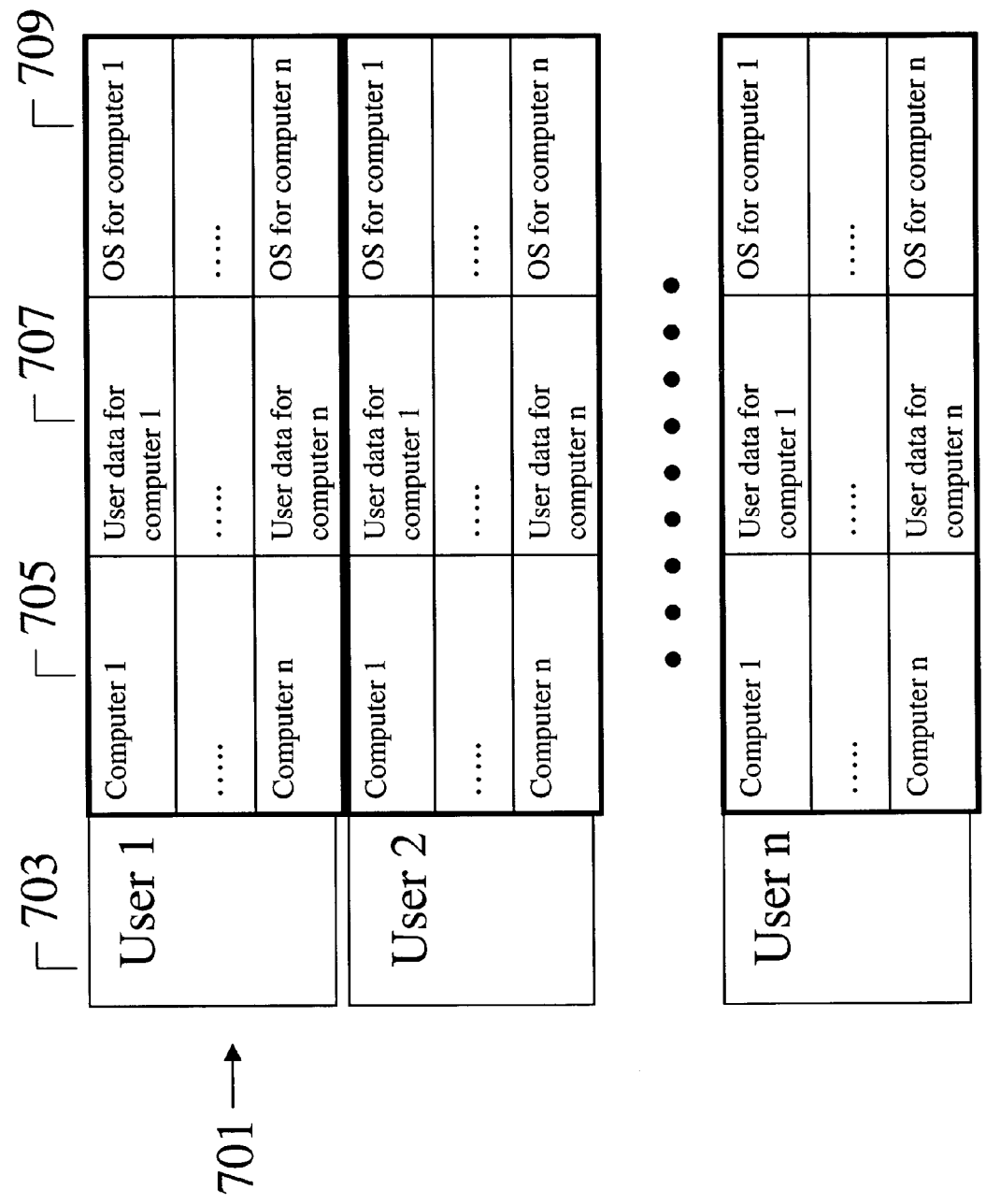
FIG. 7 is a schematic diagram illustrating a storage scheme of user information in an example embodiment of the present invention.

In an example embodiment, the server computer may contain a text file (or a database management system or the like) to store the necessary information. For instance, as shown in FIG. 7, the server computer may store information 701 for users (e.g., "User 1", "User 2", and so on). For each user, the server computer may store information regarding various client computers (e.g., "Computer 1" . . . "Computer n") 705. For each client computer, the server computer then would store information relating to the master OS that the client computer uses 709, the user data 707 and user software applications. The table shown in FIG. 7 may only contain text strings that point to where the actual information is located. Some of the information may be located in the server computer itself (e.g., the master OS), and some of the information may be located in storage devices.

In operation, a user (after having lost one of his/her computers) would connect a new computer to the server computer. The server computer would then determine (through, for example, a graphical user interface) if the new computer is a replacement for one of the old computers. If the user indicates that the new computer is replacement for "computer 1", then the server computer transfers the master OS for the new computer, and downloads the user data and software applications to the new client computer.

The various above-described embodiments of the present invention are described in more detail below with one example implementation in the context of the Linux™ operating system.

I. Setting up the server
 1. Install FC2 ("Fedora Core 2," a Linux based OS) on a server computer with 32 GB of disk space.
    a. Create a 100 MB/boot partition;
    b. Create a swap partition similar in size to that of the RAM of the server computer;
    c. Create a free space and allocate it to a Logical Volume Manager (LVM) physical volume.
    d. Create an LVM Volume Group that uses the created LVM physical volume(s).

e. Create logical volumes within the volume group (the following steps show commands specific to the FC2):
   an ext3 volume mounted at/, with 10 GB allocated.
   an ext3 volume mounted at/home, with sufficient space to store user files.
   Leave sufficient spaces within the volume group free for storing client system snapshots.
f. Select the following packages (the following list show some FC2 specific packages, and the list is not meant to be comphrensive or exclusive):
   anaconda
   anaconda-runtime
   bogl
   bogl-bterm
   booty
   busybox-anaconda
   openldap-clients
   openldap-servers
   rsync
   stateless-server
   httpd
   openssl-perl
   openldap-servers
   tftp-server 2. After the installation, reboot.
3. Set up Lightweight Directory Access Protocol (LDAP) database (for storing user and other information)
   a. Generate a root password for the LDAP server by running slappasswd. This will output an encrypted version of the password.
   b. Edit /etc/openldap/slapd.conf
      i. Edit the suffix line from "dc=my-domain, dc=com" to match your setup, e.g. to "dc=stateless-test dc=fubar, dc=org"Make similar changes to the rootdn line; e.g. from "cn=Manager, dc=my-domain, dc=com" to "cn=Manager, dc=stateless-test, dc=fubar, dc=org"
      ii. Add a rootpw line containing the newly generated password.
      iii. Add include /usr/share/stateless/stateless.schema after the other include lines (Note: the term "stateless" is a name that refers to various embodiments of the present invention.)
   c. Start the LDAP server:
      chkconfig ldap on
      service ldap start
   d. Create basic structure within the LDAP directory
      ldapadd -x -W -D cn=Manager, dc=stateless-test dc=fubar,
      dc=org<<EOF
      # Create root entry:
      dn: dc=stateless-test dc=fubar, dc=org
      dc: stateless-test
      objectClass: domain
      # Create entry to hold user accounts:
      dn: ou=people, dc=stateless-test dc=fubar, dc=org
      objectClass: organizationalunit
      ou: people
      # Create entry to hold groups:
      dn: ou=groups, dc=stateless-test dc=fubar, dc=org
      objectClass: organizationalunit
      ou: groups
      # Need the previous blank line to correctly terminate the above entry
      EOF
   e. Run authconfig
      On the Authentication Configuration page, set User Information to Use LDAP
   f. Set up NFS homedirs
      mkdir/home/users
      cat>/etc/exports && EOF
      /home/users *.fubar.org(rw,async)
      EOF
      chkconfig nfs on
      service nfs start
   g. Configure users
      Edit/etc/libuser.conf
      In the [defaults] stanza, ensure the modules and create_modules lines are as follows:
         modules=files shadow ldap krb5
         create_modules=ldap krb5
      In the [ldap] stanza, add a server=hostname line and a binddn=dc=stateless-test dc=fubar, dc=org line.
      Run system-config-users to create some test users.
4. Start apache used for kickstart file and XML file with system assignments (configuration is part of stateless-server package)
   chkconfig httpd on
   service httpd start
5. Create the bootstrap kickstart file
   cp/usr/share/doc/stateless-server-version/ks-example.cfg/var/stateless/http/ks-boostrap.cfg
   Edit ks-bootstrap.cfg and change nfs line to point to NFS-exported install tree.
6. Configure rsync and xinetd to serve out the image. First, create an/etc/rsyncd.conf as:
   [stateless]
   path=/srv/stateless/snapshots
   comment=Stateless Linux snapshots
   uid=0
   Then turn on rsync.
   chkconfig rsync on
   service xinetd restart
7. Create a bootstrap ISO (ISOLINUX is a boot loader for Linux/i386 that operates off ISO 9660/E1 Torito CD-ROMs in "no emulation" mode)
   1. cp /mnt/redhat/fc2-i386/images/boot.iso/tmp/boot-original.iso mkdir/tmp/boot-original
      mount –o loop/tmp/boot-original.iso/tmp/boot-original
      cp –aR/tmp/boot-original/tmp/boot-new
      cd/tmp/boot-new/isolinux
   2. Edit isolinux.cfg ; to the append line for 'linux' add ks=http://server-name/stateless/ks-bootstrap.cfg
   3. Edit boot. msg; modify as appropriate
   4. Review the command-line used to generate the original ISO by running isodebug/tmp/boot-original.iso
   5. cd/tmp/boot-new
   6. Run the following command-line; everything but paths should be the same as the output from isodebug above:
      mkisofs -o ../boot-new.iso -b isolinux/isolinux.bin -c isolinux/boot.cat-no-emul-boot-boot-load-size 4-boot-info-table -R-J-V "Fedora Core"-T.
   7. Use a CD burner to create a CD from this ISO; use this to turn new computers into client machines.

II. Creating a prototype system image
   1. Use anaconda (in install-to-a-root mode) to create an initial image. In order to tell anaconda to install Fedora, add a buildstamp file.

```
mkdir-p/tmp/product/cat>/tmp/product/.buildstamp
    && EOF
# Buildstamp file
anaconda
bluesky
Fedora
EOF
```
Run anaconda and perform a Personal Desktop install.
```
mkdir-p/srv/protosystems/DemoSystem/root
anaconda-m   nfs://mnt/redhat/fc2-i386/—rootpath/
   srv/stateless/protosystems/$Test42/root
```
Do not let it install a boot loader.
2. Fix up the fstab for the installed image; make sure the devices for/and/boot are
    LABEL=/and LABEL=/boot respectively, delete the swap partition line.
3. In order to get the latest development packages, point the image to a Stateless Linux yum repository: Add the following lines to/etc/yum. conf in the image root.
    [smc]
    name=Stateless Linux
    http://download.fedora.redhat.com/pub/fedora/linux/core/development/
4. Update to newer versions of packages and install various extra RPMS needed in the chroot.
    cd/srv/stateless/protosystems/DemoSystem/root chroot yum update yum install readonly-root stateless-client udev
5. Configure NFS mounted homedirs
    Edit/etc/fstab, add the line:
    [server-address]:/home/users/home/users nfs rw,nosuid,nodev,hard,intr,bg,rsize=8192,wsize=8192
    mkdir/home/users
6. Configure nss-ldap by editing/etc/ldap.conf
    a. Change host line to be host [server-address]
    b. Change base line from base example.com to base dc=stateless-test, dc=fubar, dc=org
    c. Edit /etc/nsswitch.conf, change passwd, shadow, group lines to be 'files ldap'

III. Setting Up Client Computers
1. Use the snapshot tool provided in the stateless-server package to create a snapshot of the protosystem. Internally this performs the following steps:
    Makes a copy of the file tree, using LVM snapshot technology if mounted on an appropriate device, or uses rsync otherwise
    Cleans up by removing various temporary files that ought not be present in a snapshot.
    Updates/etc/sysconfig to make the system a RW system
    Updates the LDAP database to create a record of the snapshot.
2. Add a client to the server configuration
    Edit/etc/dhcp. conf to assign an IP to MAC.
    Add the client machine's MAC address to the LDAP database to specify which protosystem and snapshot it should be running.
3. Boot the client machine using the bootstrap CD created earlier; this sets up disk partitions on the client and installs a copy of the snapshot into one set of partitions.
4. Remove the bootstrap CD from the client; reboot it. It should now boot into the snapshot.

IV. Transferring Modified Master OS to Client Computers
1. Make change in prototype system via a read-write mount of the prototype system, or by using chroot.
2. Take a new snapshot using the tool; this will update the LDAP directory
3. Client machines check the LDAP directory every hour to see what they should be running. If an update is detected, a client will automatically rsync the new file tree into its reserve partitions.
4. Reboot the client machine after an update has occurred in order to use the new snapshot.

While there have been shown and described examples of the present invention, it will be readily apparent to those skilled in the art that various changes and modifications may be made without departing from the scope of the invention as defined by the following claims. The present invention is applicable to any operating system (e.g., Linux™, Unix, Microsoft Windows, MacOS, etc.). Accordingly, the invention is limited only by the following claims and equivalents thereto.

What is claimed is:

1. A server computer in a computer system, the server computer comprising:
    a master operating system (OS) comprising a set of computer program files and at least one configuration file to operate a client computer, wherein the master OS forms a complete operating system;
    a version managing program configured to:
        create a new version of the master OS by modifying at least one of the set of computer program files; and
        maintain a plurality of versions of the master OS, including the new version of the master OS; and
    a server program configured to transfer the new version of the master OS as read-only files to at least one of a plurality of client computers each having a cache memory that includes a first logical partition and a second logical partition, wherein the new version of the master OS is transferred to be cached in the second logical partition of the at least one client computer if an older version of the master OS that is being used to operate the at least one client computer resides in the first logical partition.

2. The server computer of claim 1, wherein the version managing program is further configured to maintain the at least one modified file and an original of the at least one modified file.

3. The server computer of claim 1, further comprising:
    at least one more master OS; and
    a mapping program configured to assign one of the master OS and the at least one more master OS to the at least one of the plurality of the client computers.

4. The server computer of claim 1, further comprising:
    a removable mass storage device configured to write the master OS on to a removable storage medium.

5. The server computer of claim 1, further comprising:
    a data management program that stores user information for one or more users, wherein the user information comprises information about one or more computers being used by each user and user data for each of the one or more computers.

6. The server computer of claim 5, further comprising:
    a user interface program coupled to the data management program, wherein the user interface program allows a user to download the corresponding user information and user data to a new computer.

7. A computer system, comprising:
    a plurality of client computers, each of which has a cache memory including a first logical partition and a second logical partition; and
    a server computer comprising:
        at least one master operating system (OS) comprising a set of computer program files and at least one configuration file to operate a client computer, wherein the at least one master OS forms a complete operating system;

a version managing program for:
creating a new version of the at least one master OS by modifying at least one of the set of computer program files; and
maintaining a plurality of versions of the at least one master OS, including the new version of the at least one master OS; and a server program for transferring the new version of the at least one master OS as read-only files to at least one of the plurality of client computers, wherein the new version of the at least one master OS is transferred to be cached in the second logical partition of the at least one client computer if an older version of the at least one master OS that is being used to operate the at least one client computer resides in the first logical partition.

8. The computer system of claim 7, wherein the server computer further comprises a removable mass storage device that writes the at least one master OS on to a removable storage medium.

9. The computer system of claim 7, the server computer further comprising:
a data management program that stores user information for one or more users, wherein the user information comprises information about one or more computers being used by each user and user data for each of the one or more computers.

10. The computer system of claim 9, wherein at least one of the plurality of client computers further comprises:
a user interface program coupled to the data management program, wherein the user interface program allows a user to transfer stored user information and user data for one of the computers to a new computer.

11. The computer system of claim 7, wherein the server program sends an instruction to the one or more client computers to reboot using the new version of the at least one master OS after the new version of the at least one master OS is cached in the second logical partition.

12. A computer assisted method comprising the acts of:
creating a master operating system (OS) on a server computer, the master operating system comprising a set of computer program files and at least one configuration file to operate a client computer, wherein the master OS forms a complete operating system;
creating a new version of the master OS on the server computer by modifying at least one of the set of computer program files;
maintaining on the server computer a plurality of versions of the master OS, including the new version of the master OS; and
transferring the new version of the master OS as read-only files from the server computer to at least one of a plurality of client computers each having a cache memory that includes a first logical partition and a second logical partition, wherein the new version of the master OS is transferred to be cached in the second logical partition of the at least one client computer if an older version of the master OS that is being used to operate the at least one client computer resides in the first logical partition.

13. The method of claim 12, further comprising the acts of maintaining the at least one modified file and an original of the at least one modified file.

14. The method of claim 12, further comprising the acts of:
creating at least one more master OS; and
assigning one of the master OS and the at least one more master OS to the one of the plurality of the client computers.

15. The computer assisted method of claim 12, further comprising the act of sending an instruction from the server computer to the at least one of a plurality of client computers to reboot using the new version of the master OS after the new version of the master OS is cached in the second logical partition.

16. A computer program product, residing on a non-transitory computer-readable medium, the computer program product comprising computer instructions for execution on a server computer to:
create a master operating system (OS) on the server computer, the master OS comprising a set of computer program files and at least one configuration file to operate a client computer, wherein the master OS forms a complete operating system;
create a new version of the master OS by modifying at least one of the set of computer program files;
maintain a plurality of versions of the master OS, including the new version of the master OS; and
transfer the new version of the master OS as read-only files to at least one of a plurality of client computers each having a cache memory that includes a first logical partition and a second logical partition, wherein the new version of the master OS is transferred to be cached in the second logical partition of the at least one client computer if an older version of the master OS that is being used to operate the at least one client computer resides in the first logical partition.

17. The product of claim 16, further comprising computer instructions to maintain the at least one modified file and an original of the at least one modified file.

18. The product of claim 16, further comprising computer instructions to:
create at least one more master OS; and
assign one of the master OS and the at least one more master OS to the one of the plurality of the client computers.

19. The server computer of claim 1, wherein the server program is further configured to instruct the at least one client computer to reboot using the new version of the master OS after the new version of the master OS is cached in the second logical partition.

20. The product of claim 16, further comprising computer instructions to send an instruction to the at least one of a plurality of client computers to reboot using the new version of the master OS after the new version of the master OS is cached in the second logical partition.

* * * * *

UNITED STATES PATENT AND TRADEMARK OFFICE
CERTIFICATE OF CORRECTION

PATENT NO. : 8,346,886 B2  
APPLICATION NO. : 10/935712  
DATED : January 1, 2013  
INVENTOR(S) : Jonathan Richard Blandford Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this
Eighteenth Day of November, 2014

Michelle K. Lee
*Deputy Director of the United States Patent and Trademark Office*